May 16, 1961

A. J. SPENCER 2,984,823

DATA STORAGE DEVICES

Filed March 6, 1956

INVENTOR
ARTHUR JAMES SPENCER

BY [signature]

ATTORNEY

United States Patent Office 2,984,823
Patented May 16, 1961

2,984,823

DATA STORAGE DEVICES

Arthur James Spencer, Sutton Coldfield, England, assignor to International Computers and Tabulators Limited, London, England, a British company Filed Mar. 6, 1956, Ser. No. 569,842

Claims priority, application Great Britain Apr. 5, 1955

5 Claims. (Cl. 340—172.5)

The invention relates to data storage means.

It is well known to store data using cores of magnetic material, having a substantially rectangular hysteresis loop, by switching the cores between one or the other state of magnetic saturation. Hereinafter these states will be referred to as the P and N states. They may be taken to represent a binary "1" and a binary "0" respectively.

A plurality of such cores can be arranged in the form of a matrix to store a plurality of digits, data being read into or out of the cores comprising the matrix either simultaneously or selectively.

It is also known to use magneto-strictive material, in the form of wire, tube etc., as a delay line.

It is an object of the invention to use a matrix of magnetic cores to translate data sensed from a record card in one code to data expressed in a second code and to store the data in the second code.

It is a further object of the invention to use one or more magneto-strictive delay lines to effect a read-out of stored data from a matrix of magnetic cores, such read-out being in serial form, or in a serial/parallel form.

According to the invention an electrical signal storage device comprises a plurality of bistable magnetic core elements adapted to be switched between alternative states of saturation to store signals applied thereto, means for applying a read out signal simultaneously to such elements, and one or more delay lines coupled, at spaced points along its length, or their lengths, to individual ones of such elements, and further coupled to a utilisation device. The magnetic core elements may be switched under joint control of input signals and control signals synchronised therewith. The input signals may be derived from record sensing means.

The invention will now be described, by way of example, with reference to the accompanying drawing, in which.

Data is sensed from a conventional record card in which digits are represented by holes punched in selected positions on the card. The time at which these positions are sensed is referred to as the digit time, thus a hole at a position representing the decimal digit 6 is sensed at the "6" digit time. In the description that follows it will be assumed that a five-figure decimal number is recorded in five columns of the record card. Each digit of this number is translated into a four-component code in which the code components represent the values 1, 2, 4 and 8. Thus the decimal digit 6 is represented by the presence of the code components 2 and 4, and the absence of the components 1 and 8.

A matrix of magnetic cores is used to store these code components. There is one column of four cores for each of the five digits, each of the four cores of a column being used to store one of the code components of a digit. A magnetic core matrix utilizing the coincident energization of selected coordinate lines to store binary data is described in an article entitled "Static Magnetic Matrix Memory and Switching Circuits" by J. A. Rajchman in the "R.C.A. Review" for June 1952.

Translation to the four-component code is effected by setting the cores either to the P state or to the N state under the combined control of data sensed from a record card and commutator. Each digit is read-in at the corresponding digit time and those cores which are to be set to the P state to represent the presence of the code components of that digit are set to the P state simultaneously.

Figure 1:
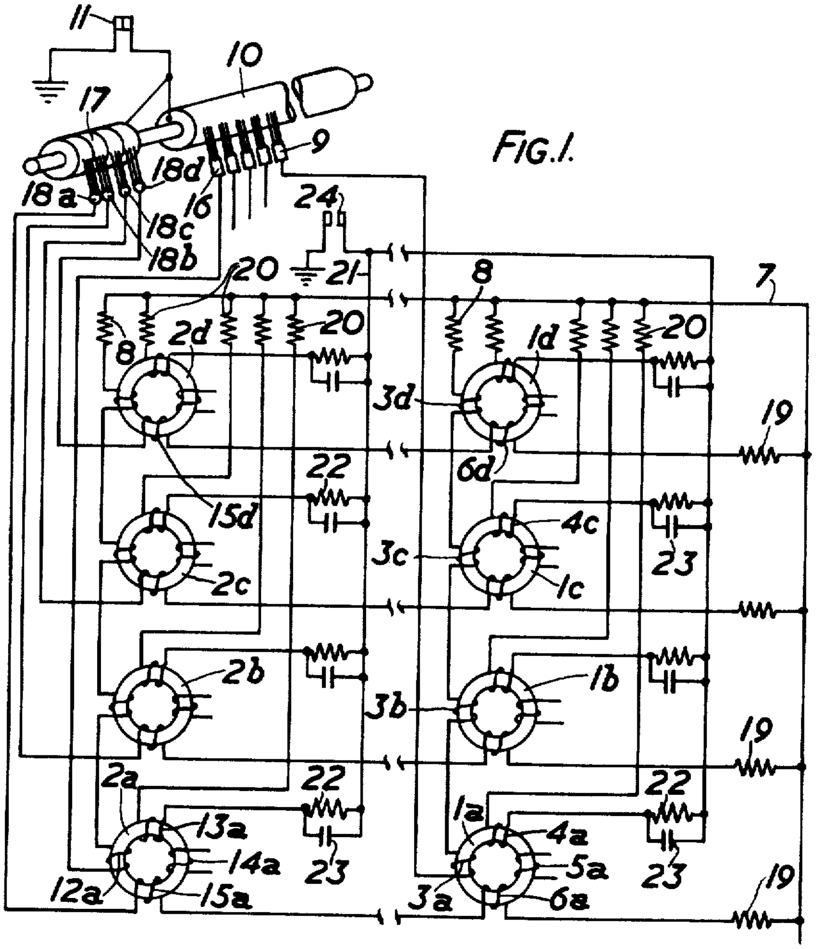
Figure 1 is a circuit diagram of matrix of cores adapted to store data sensed from two columns of a record card.

In Figure 1 four cores 1 are used to store the four code components of the least significant digit of a number. The core used to store the code component "1" has the suffix *a*, while those used to store the "2," "4" and "8" components have the suffixes *b*, *c*, and *d* respectively.

Each core has four windings, 3, 4, 5 and 6. When a winding on a specific core is referred to, the suffix *a*, *b*, *c* or *d* of that core will be added to the winding reference, thus the windings on the core 1*b* will be referenced 3*b*, 4*b*, 5*b* and 6*b*.

The windings 3 are connected in series with each other. One end is connected through a resistor 8 to a supply line 7 and the other end is connected to a brush 9 which senses the least significant column of the record card. When a hole is sensed, the brush makes contact with a sensing roller 10 which can be earthed by closing contacts 11.

Data sensed from the other four columns of the card is stored on similar groups of four cores. For clarity, however, of these only cores 2 which store the most significant digit are shown.

The cores 2 have four windings 12, 13, 14 and 15 which correspond with the windings 3, 4, 5 and 6 on the cores 1. The windings 12 are connected to a brush 16 which senses the most significant column of the card.

On the same shaft as the sensing roller 10 is a commutator 17 having four brushes 18. The windings 15*a* and 6*a* are connected in series with each other and the brush 18*a*. The windings 15*a* and 6*a* are also connected via a current limiting resistor 19 to the line 7. The corresponding windings 15 and 6 on the other cores are similarly connected to the brushes 18*b*, 18*c* and 18*d*. The commutator 17 is electrically connected to the sensing roller 10, so that when the contacts 11 are closed and one or more of the brushes 18 are in contact with a conducting segment of the commutator, the corresponding windings 15 and 6 are energised.

The pattern of the segments on the commutator 17 is such that at each digit time, the windings 15 and 6 are energised selectively according to the coding of the digit. Thus at "6" digit time the brushes 18*b* and 18*c* are in contact with a conducting segment of the commutator and the windings 15*b*, 6*b*, 15*c* and 6*c* are energised, these windings being those on the cores which store the "2" and "4" code components.

When a hole in the least significant column of the card is sensed, the windings 3 are energised, and similarly the windings 12 are energised when a hole in the most significant column is sensed.

The direction of the windings 3 and 4, and 12 and 13 is such that when they are energised, the resulting magneto-motive force in each case tends to drive the core in the P direction. The magneto-motive force resulting from the energising of a single winding is, however only about half that necessary to switch the core from N to P, but when two windings on the same core are energised simultaneously, the combined magneto-motive force is sufficient to switch the core.

To read-in data to the cores, which are all originally set to the N state, a card is fed between the brushes 9 and 16 and the sensing roller, and the contacts 11 are closed.

If there is a digit 6 recorded in the least significant column of the card, the winding 3 will be energised at the "6" digit time. At this time the winding 6*b* and 6*c* are energised as well, as explained above. The cores 1*b* and 1*c* are therefore switched to the state P. The brushes 18*a* and 18*d* are on an insulating portion of the commutator 17 so that the windings 6*a* and 6*d* are not energised. The cores 1*a* and 1*d* have only the windings 3*a* and 3*d* respectively energised so these cores are not switched but remain in the state N.

Data sensed from the other columns of the card is used to set selected cores to the P state in the other columns of the matrix in a similar manner, at the corresponding digit times.

To read-out the stored data, a magneto-motive force sufficient to drive a core to saturation in the N direction is produced in all the cores simultaneously.

Those cores which are in the P state switch to N, but those which are already in the N state do not change. This change from P to N of a set core is used to indicate the data stored on the core. As the process of reading out the matrix leaves all the cores set to N, the matrix is ready to receive further data immediately.

To set the cores to the N state initially, preparatory to reading-in data, a preliminary read-out cycle is effected, and the contacts 11 are opened until a card has been fed to the sensing station.

All the cores of the matrix are read-out simultaneously and to obtain a serial train of pulses from this output, a magneto-strictive delay line is used, having one transmitting coil for each core and a single output coil. Such a line is the functional equivalent of a tapped electromagnetic delay line, since the different transmitting coils are at different distances from the receiving coil. Each transmitting coil generates an acoustic pulse in the line for each electrical pulse applied to the coil. On reaching the receiving coil, the acoustic pulse generates an electrical pulse. The acoustic pulses produced by the different transmitting coils all travel at the same speed, so that if electrical pulses are applied simultaneously to all the transmitting coils, the receiving coil will generate a corresponding serial train of pulses, since the transmitting coils are at different distances from the receiving coil.

Each of the windings 13 and 4 are connected to the line 7 through a resistor 20 and to a line 21 through a resistor 22. A capacitor 23 is connected across the resistors 22. The line 21 can be earthed by closing normally open contacts 24. When these contacts are closed, the windings 13 and 4 are all energised simultaneously and the resulting flux is such that each core is driven to saturation in the N direction.

When reading-out the matrix, the windings 3, 12, 6 and 15 are rendered inoperative by arranging that the brushes 18 will all remain on an insulating portion of the commutator 17 and that a blank portion of the card insulates the brushes 9 and 16 from the sensing roller 10. Alternatively relay operated contacts (not shown) can be inserted in the leads to the brushes 18, 16 and 9 to disconnect them from their associated windings during read-out of data from the matrix. The contacts 24 are closed to energise the windings 4 and 13. Those cores which were in the P state switch to N and the resulting change in flux is linked with the windings 5 and 14. The flux change in the cores which were already in the N state is small and can be neglected.

Figure 2:
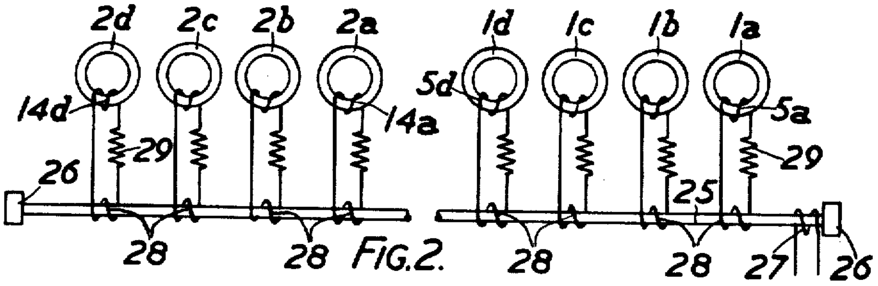
Figure 2 is a schematic drawing of a magneto-strictive delay line used in conjunction with the matrix of cores.

For clarity the windings 5 and 14 on the cores 1 and 2 are shown separately in Figure 2. Each winding is connected to a separate transmitting coil 28 through a resistor 29. The coils 28 are wound on polythene formers and are equally spaced along a magneto-strictive delay line 25 which has a polarised output coil 27 near one end. The ends of the delay line are embedded in damping material 26 to minimise reflections. The coil 28 which is connected to the winding 5*a* is nearest to the output coil 27, followed in order by the coils connected to the windings 5*b*, 5*c* and 5*d* and the corresponding coils of other denominations in ascending order, so that the coil connected to the winding 14*d* is the most remote from the coil 27.

When a core is switched from P to N, the change in flux linking the windings 5 and 14 induces a current pulse in the windings which pulses the corresponding transmitting coil 28.

The operation of the delay line is such that if a selected one of the coils 28 is pulsed, the magneto-strictive effect on the material of the line inside the coil, produces an acoustic pulse which travels at constant speed towards one end of the line and a similar pulse which travels to the other end of the line. When they reach the ends of the line the pulses are damped in the material 26. When a pulse passes through the polarised coil 27, the magnetic flux linking the coil is disturbed giving rise to an electrical pulse in the coil. The output pulses from the coil 27 can be amplified, reshaped and gated in a known manner and used to operate further electronic devices.

If every core of the matrix is in the P state, it will be seen that in reading out this data, all the coils 28 will be pulsed and the resulting output from the coil 27 will be a train of pulses. The coils 28 are evenly spaced so that the pulses generated in the receiving coil in response to acoustic pulses from any pair of adjacent transmitting coils will be separated by an interval of $t$ microseconds, where $t$ equals the distance between adjacent transmitting coils divided by the velocity of propagation of the acoustic pulse. Hence, whatever combinations of cores are in the P state, the resulting outputs from the coil 27 represent in ordered serial form, the code components of the five decimal digits stored on the cores, beginning with the "1" code component of the least significant digit. The time at which the pulse representing such "1" component will occur, if the related core has been switched, is dependent upon the distance between the corresponding transmitting coil and the receiving coil. If no pulse occurs at this time, it indicates that the core was not switched. The presence, or absence, of a pulse $t$ microseconds later indicates that the core representing the "2" component of the least significant digit was, or was not switched. Thus the significance of the pulses of the serial output train is determined by their timing relative to the time at which the windings 4 and 13 of the cores are pulsed.

A similar output pulse train can be obtained if the coil 27 is in the centre of the delay line and the coils 28 are spaced alternately at appropriate distances on either side.

If it is required to produce an output in which the pulses representing the code components of the most significant digit come first, the order of the groups of digit coils in relation to the coil 27 is reversed.

The time which elapses between the closing of the contacts 24 and the time at which the lowest code component of the least significant digit is read out can be varied by altering the distance between the coil 27 and the first coil 28.

The duration of an individual pulse in the coil 27 is greater than the corresponding initiating pulse in the coil 28, and the shapes of the pulses are different. Some control over the output pulse duration is possible by controlling the switching time of the cores. To simplify the reshaping of output pulses from the coil 27, it is preferable that the pulse duration should approximate to $t/2$. To obtain this duration output pulse, it has been found that the switching time of the cores should be about $2t/5$. This switching time can be obtained by a correct choice of the number of turns in the windings 4 and 13 and the values of the resistors 20 and the capacitors 23.

The information stored on the cores is destroyed by reading out. If it is desired to read out the same information several times, the delay line described above may be replaced by a magneto-strictive delay line storage device similar to that shown and described in British patent specification No. 698,061. This storage device consists of a magneto-strictive wire, or the like, with a plurality of recording coils spaced along it. Energization of a recording coil produces a change in the remanent magnetic state of the portion of the wire within the coil. Thus, by energizing selected coils data may be temporarily stored as a remanent magnetic pattern. By energizing a transmitting coil, an acoustic pulse is generated and propagates along the wire. Each time the acoustic pulse passes through a portion of the wire where the remanent condition has been changed an electric pulse is generated in a receiving coil. Hence the data stored as a remanent pattern is converted into a corresponding serial pulse train each time the transmitting coil is energized. Applied to the present invention, the individual recording coils are energized by the individual windings 5 and 14, so that the data read out from the cores is stored as a remanent pattern. This data may then be read out as a serial pulse train when desired by applying a pulse to the transmitting coil. Thus the magnetostrictive storage device accepts signals occurring simultaneously, stores them and allows subsequent reading out in serial form, in the same way as in a shifting register, for example, the individual stages may be set simultaneously and the stored settings then read out serially.

Although mechanical contacts 24 have been shown for clarity, to ensure accurate timing of the pulse train from the coil 27, it is preferable that the read-out pulse in the windings 4 and 13 should be initiated by electronic means, such as by the firing of a gas-filled valve. In this case the windings 4 and 13 could be part of the anode circuit of the valve. If necessary all the windings 4 and 13 could be in series instead of in parallel as shown, with constant current drive from one valve.

In some electronic calculating devices the four code components of a digit are operated on simultaneously, each denomination of the digits being presented serially. The output from the matrix can be presented in this form by employing four delay lines, each having five transmitting coils and an output coil. One line has the five coils connected to the windings on the cores, which store the "1" code components, the second those which are connected to the windings on the cores which store the "2" code components and similarly with the other delay lines. The spacing of the coils on the lines is such that the pulses representing the four code components of a digit are produced in the respective output coils simultaneously.

Although the invention has been described in connection with data sensed from a record card and expressed in a particular code, it will be appreciated that the invention can apply to input data from other sources and expressed in other codes. It is not necessary to use a transmitting coil 28 for each core; if a suitable coding is adopted, a coil 28 may be connected to two or more cores, providing that only one core provides an output pulse at any particular time.

The core has been shown with four windings, two used only for reading-in data, and two used only for reading-out. By suitable switching, one winding may be used for two purposes, thus reducing the number of windings per core to three or two.

What I claim is:

1. A data storage arrangement comprising means operable to sense simultaneously a plurality of columns of a punched record card index point by index point, a matrix of bi-stable magnetic storage cores arranged in rows and columns each row corresponding to a different value and each column corresponding to a column of said card, a set of read-in windings, each read-in winding being coupled to all the cores of a column and being energised in response to the sensing of a punching in a column of said card, a set of control windings, each control winding being coupled to all the cores of a row, switching means operable in synchronism with said card sensing means and operative to energise said control windings selectively, each of said cores being settable from a first stable state to a second stable state in response to the simultaneous energisation of the read-in and control windings coupled thereto, so that the sensing by said sensing means of a punching in a column of said card causes the data which that punching represents to be stored in the corresponding column of said matrix, a magnetostrictive delay line member, a plurality of transmitting coils spaced apart along said member and coupled thereto, a signal pick up coil coupled to said member, a plurality of output windings for said cores of said matrix, each output winding being coupled to one of said cores and being also connected to one of said transmitting coils, and means operable after a card has been sensed to reset all said cores simultaneously to the first stable state to induce in the output winding of each core, which was previously set to the second stable state, a signal which energises the transmitting coil connected to that output winding to produce a sonic pulse which travels along said magnetostrictive member and induces an electrical output signal in said pick up coil, whereby operation of said resetting means causes electrical signal representing the whole of the data from such sensed card to be induced serially in said pick up coil.

2. A data storage arrangement comprising means operable to sense a multi-column punched record card index point by index point, a matrix of bi-stable magnetic storage cores arranged in rows and columns, each row corresponding to a particular value and each column corresponding to a column of said card, a set of read in windings, each read in winding being coupled to all the cores of a column and being energised in response to the sensing of a punching in the column of the card which corresponds to that column of cores, a set of control windings, each control winding being coupled to all the cores of a row, first switching means operable in synchronism with said cord sensing by said sensing means and operative to energise said control windings selectively to set the cores of said matrix selectively to a first stable state to represent the data sensed from all the index point positions of said card, each core being set to the first stable state from a second stable state in response to the simultaneous energisation of the read in and control windings coupled thereto, an output winding individual to each core, resetting windings coupled to all said cores, second switching means operable after the cores have been set to represent the data sensed from a card and effective to energise the resetting windings to reset simultaneously all said cores to said second stable state to induce a signal in the output winding of each core which is switched from the first to the second stable state, a magnetostrictive delay line member, a plurality of transmitting coils spaced apart along said member and coupled thereto, each transmitting coil being connected to a different one of said output windings and being responsive to a signal induced in the associated output winding to produce a sonic pulse which is propagated along the magnetostrictive member, and a pick up coil coupled to the magnetostrictive member and responsive to the sonic pulses propagated along said member to generate a serial train of electrical signals representative of the punchings sensed from said card.

3. A data storage arrangement as claimed in claim 2, having feeding means operable to feed the card past said sensing means, and a coding commutator operating in synchronism with said feeding means and effective to control energisation of said control windings to set said cores to store the data sensed from the card in a coded form different from that in which the data is punched in the card.

4. A data storage arrangement as claimed in claim 2, having a resetting winding individual to each core, a resistor and a capacitor connected in series with each resetting winding, and connections including an electrical contact operable to apply an energising current in parallel to all the series circuits consisting of a resetting winding and the associated resistor and capacitor.

5. A data storage arrangement as claimed in claim 4, in which the transmitting coils are equally spaced at intervals along the magnetostrictive member such that the signals induced in the pick-up coil by simultaneous energisation of two adjacent transmitting coils are separated by a time $t$ and in which the constants of the resetting winding and the associated register and capacitor are such that the switching time of a core when resetting is made approximately $2t/5$.

References Cited in the file of this patent

UNITED STATES PATENTS

| | | |
|---|---|---|
| 2,106,801 | Houston | Feb. 1, 1938 |
| 2,189,046 | Smith et al. | Feb. 6, 1940 |
| 2,580,870 | Wilkerson | Jan. 1, 1952 |
| 2,652,501 | Wilson | Sept. 15, 1953 |
| 2,691,156 | Saltz et al. | Oct. 5, 1954 |
| 2,702,380 | Brustman et al. | Feb. 15, 1955 |
| 2,734,184 | Rajchman | Feb. 7, 1956 |
| 2,774,429 | Rabenda | Dec. 18, 1956 |
| 2,784,390 | Chien | Mar. 5, 1957 |
| 2,790,160 | Millership | Apr. 23, 1957 |
| 2,888,666 | Epstein | May 26, 1959 |
| 2,931,014 | Buchholz | Mar. 29, 1960 |

OTHER REFERENCES

"Applications of Magnetostriction Delay Lines," by R. C. Robbins and R. Millership, published March 25, 1953, in "Automatic Digital Computation. Proc. of a Symp. National Physics Lab.," pp. 199–210.